United States Patent
Park

(10) Patent No.: US 11,521,424 B2
(45) Date of Patent: Dec. 6, 2022

(54) ELECTRONIC DEVICE AND CONTROL METHOD THEREFOR

(71) Applicant: Samsung Electronics Co., Ltd., Suwon-si (KR)

(72) Inventor: Heewon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 16/768,989

(22) PCT Filed: Jan. 18, 2019

(86) PCT No.: PCT/KR2019/000799
§ 371 (c)(1),
(2) Date: Jun. 2, 2020

(87) PCT Pub. No.: WO2019/151689
PCT Pub. Date: Aug. 8, 2019

(65) Prior Publication Data
US 2021/0224522 A1    Jul. 22, 2021

(30) Foreign Application Priority Data
Jan. 31, 2018 (KR) .......................... 10-2018-0011864

(51) Int. Cl.
*G06V 40/16* (2022.01)
*H04M 1/72454* (2021.01)
(Continued)

(52) U.S. Cl.
CPC ............ *G06V 40/172* (2022.01); *G06F 21/32* (2013.01); *G06V 40/167* (2022.01);
(Continued)

(58) Field of Classification Search
CPC .. G06V 40/172; G06V 40/167; G06V 40/169; G06V 40/174; G06V 40/1365;
(Continued)

(56) References Cited

U.S. PATENT DOCUMENTS

2012/0027267 A1* 2/2012 Kim .................... G06K 9/00288
382/118
2013/0227651 A1* 8/2013 Schultz ............... H04L 63/0861
726/4
(Continued)

FOREIGN PATENT DOCUMENTS

JP    2011-223369 A    11/2011
JP    2016-149063 A     8/2016
(Continued)

OTHER PUBLICATIONS

Korean Office Action dated May 15, 2022, issued in Korean Patent Application No. 10-2018-0011864.

*Primary Examiner* — Nimesh Patel
(74) *Attorney, Agent, or Firm* — Jefferson IP Law, LLP

(57) ABSTRACT

An electronic device and a control method therefor are disclosed. A control method for an electronic device according to the present disclosure comprises the steps of: when a preset event is detected, acquiring a user image by photographing a user; acquiring a facial image including the user's face from the photographed user image and storing the facial image; and when a user input for identification of the facial image is received, providing the stored facial on the basis of at least one of a time and a place.

9 Claims, 13 Drawing Sheets

(51) Int. Cl.
    *G06F 21/32* (2013.01)
    *H04N 5/232* (2006.01)
(52) U.S. Cl.
    CPC .......... *G06V 40/169* (2022.01); *G06V 40/174* (2022.01); *H04M 1/72454* (2021.01); *H04N 5/23219* (2013.01); *H04N 5/23238* (2013.01); *H04M 2250/52* (2013.01)
(58) Field of Classification Search
    CPC .... G06V 40/176; G06V 40/165; G06V 10/17; G06V 40/193; G06V 20/52; G06V 40/103; G06V 40/15; G06V 40/20; G06V 40/70; G06V 40/10; G06V 40/16; G06V 40/161; G06F 21/32; G06F 3/01; G06F 21/36; G06F 3/011; G06F 2203/011; G06F 40/30; G06F 3/012; G06F 16/436; G06F 3/015; G06F 3/0482; G06F 3/048; G06F 16/54; G06F 3/0481; H04M 1/72454; H04M 2250/52; H04M 1/72463; H04N 5/23219; H04N 5/23238; H04N 1/00381; H04N 1/00437; G06K 9/6272; G06K 9/6269; G06K 9/6256; G06K 9/6267; G06K 9/00; G06K 9/6268; G06K 9/6201; G06K 9/6218; G06K 9/6292; G06Q 30/0631; G06Q 50/01; G06Q 30/0643; G06Q 30/0282; G06Q 30/06; G06Q 30/0277; G06Q 30/0281; G06Q 30/0627; G06Q 30/0253; G06Q 30/0254; G06Q 30/0267; G06Q 30/0637; G06N 3/0454; G06N 20/00; G06N 3/08; G06N 3/04; G06N 3/004; G06N 3/008; G06N 5/022; G06N 5/003

See application file for complete search history.

(56) References Cited

U.S. PATENT DOCUMENTS

| | | | |
|---|---|---|---|
| 2014/0307926 A1* | 10/2014 | Murakami | ................ G06T 7/20 |
| | | | 382/107 |
| 2015/0098657 A1 | 4/2015 | Melzer | |
| 2017/0311863 A1* | 11/2017 | Matsunaga | ............ A61B 5/163 |
| 2018/0357400 A1 | 12/2018 | Astrakhantsev et al. | |

FOREIGN PATENT DOCUMENTS

| | | | |
|---|---|---|---|
| KR | 10-2007-0020683 | A | 2/2007 |
| KR | 10-2009-0001848 | A | 1/2009 |
| KR | 10-2010-0104388 | A | 9/2010 |
| KR | 10-2012-0107033 | A | 9/2012 |
| KR | 10-1706371 | B1 | 2/2017 |
| KR | 10-2017-0068305 | A | 6/2017 |
| KR | 10-1754093 | B1 | 7/2017 |

* cited by examiner

ELECTRONIC DEVICE AND CONTROL METHOD THEREFOR

TECHNICAL FIELD

The disclosure relates to an electronic device and a control method therefor, and more particularly, to an electronic device for acquiring a user's facial image when a user is using an electronic device and providing the emotional state of the user to the user, or a control method therefor.

BACKGROUND ART

Recently, algorithms recognizing a user's face through various methods, and determining the emotional state (stress, the degree of happiness, the degree of fatigue, etc.) of the recognized face are being provided. Through the aforementioned various algorithms, a user may identify his or her emotional state, etc. in a photograph wherein his or her face is included.

However, in general, in case a facial photograph of a specific user is photographed, it often becomes artificial photographing. Also, it would be difficult to periodically photograph a user's face during a specific time period. That is, when taking a photograph for analyzing a user's emotion, if a specific behavior is demanded (e.g., a behavior such as taking a photograph by executing a camera application) to the user, it will be highly likely that the genuine emotional state of the user cannot be figured out.

Accordingly, there may be problems in determining by what method a photograph will be taken for analyzing a user's emotion in everyday life, and by what method the photographed picture will be analyzed and the analysis result will be provided.

DETAILED DESCRIPTION OF THE INVENTION

Technical Problem

The disclosure was devised for resolving the aforementioned problems, and relates to an electronic device which is cable of performing photographing when a preset event occurs, and providing the photographed picture, and a control method therefor.

Technical Solution

A control method for an electronic device according to an embodiment of the disclosure for achieving the aforementioned purpose includes the steps of, based on a preset event being detected, acquiring a user image by photographing a user, acquiring a facial image including the user's face from the photographed user image and storing the facial image, and based on a user input for identification of the facial image being received, providing the stored facial image on the basis of at least one of a time and a place.

Here, the control method may further include the step of analyzing the facial image and determining an emotion corresponding to the facial image among a plurality of emotions.

Here, the providing step may include the steps of, based on a user input for identification of an emotion corresponding to the facial image being received, classifying the plurality of determined emotions during a preset period, and providing the facial image corresponding to the classified emotions.

Here, the storing step may further include the step of, based on data related to the time that the user image is photographed being present, matching the photographed user image and the data and storing them.

Here, the storing step may include the step of matching location information corresponding to the photographed user image with the user image and storing them.

Here, the providing step may further include the step of, based on the stored facial image being present in a plural number, providing the plurality of facial images in the form of a panorama on the basis of at least one of a time and a place.

Here, the preset event may be at least one of a lock release event, a text message reception event, a phone call reception event, an application execution event, or a content viewing event of the electronic device.

Here, the lock release event may include at least one of iris recognition, face recognition, fingerprint recognition, or pattern recognition.

Meanwhile, an electronic device according to another embodiment of the disclosure for achieving the aforementioned purpose includes a camera, a display, a memory, and a processor configured to, based on a preset event being detected, acquire a user image by photographing a user by controlling the camera, and acquire a facial image including the user's face from the photographed user image and store the facial image in the memory, and based on a user input for identification of the facial image being received, control the display to provide the stored facial image on the basis of at least one of a time and a place.

Here, the processor may analyze the facial image and determine an emotion corresponding to the facial image among a plurality of emotions.

Here, the processor may, based on a user input for identification of an emotion corresponding to the facial image being received, classify the plurality of determined emotions during a preset period, and control the display to provide the facial image corresponding to the classified emotions.

Here, the processor may, based on data related to the time that the user image is photographed being present, match the photographed user image and the data and store them in the memory.

Here, the processor may match location information corresponding to the photographed user image with the user image and store them in the memory.

Here, the processor may, based on the stored facial image being present in a plural number, control the display to provide the plurality of facial images in the form of a panorama on the basis of at least one of a time and a place.

Here, the preset event may be at least one of a lock release event, a text message reception event, a phone call reception event, an application execution event, or a content viewing event of the electronic device.

Here, the lock release event may include at least one of iris recognition, face recognition, fingerprint recognition, or pattern recognition.

Effect of the Invention

According to the various embodiments of the disclosure as above, an electronic device can photograph a user's face naturally without demanding photographing to a user, and provide the facial image.

BEST MODE FOR IMPLEMENTING THE INVENTION

Figure 1:
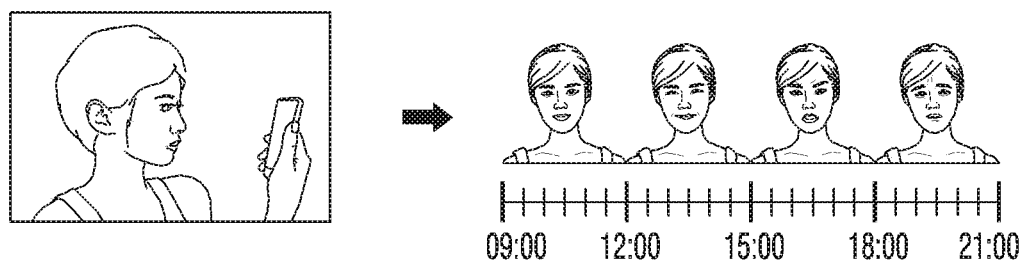
FIG. 1 is an exemplary diagram for illustrating a method for collecting and providing a user's facial image according to an embodiment of the disclosure.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies. Also, in specific cases, there are terms that were arbitrarily designated by the applicant, and in such cases, the meaning of the terms will be described in detail in the relevant descriptions of the disclosure. Thus, the terms used in the disclosure should be defined based on the meaning of the terms and the overall content of the disclosure, but not just based on the names of the terms.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Terms such as "first," "second" and the like may be used to describe various elements, but the terms are not intended to limit the elements. Such terms are used only to distinguish one element from another element.

Also, singular expressions include plural expressions, unless defined obviously differently in the context. Further, in this specification, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In the embodiments of the disclosure, 'a module' or 'a part' may perform at least one function or operation, and may be implemented as hardware or software, or as a combination of hardware and software. Further, a plurality of 'modules' or 'parts' may be integrated into at least one module and implemented as at least one processor (not shown), excluding 'a module' or 'a part' that needs to be implemented as specific hardware.

Also, in the embodiments of the disclosure, the description that a part is "connected with" another part includes not only a case wherein the parts are "directly connected," but also a case wherein the parts are "electronically connected" with another element existing in between. Also, the description that a part "includes" an element means that another element may be further included, but not that another element is excluded, unless there is a particular opposing description.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

In addition, in the embodiments of the disclosure, "applications" refer to a collection of a series of computer programs designed for performing specific tasks. In the embodiments of the disclosure, applications may be diverse. For example, there may be a game application, a moving image reproducing application, a map application, a memo application, a calendar application, a phone book application, a broadcasting application, an exercise supporting application, a payment application, a photograph folder application, a medical device controlling application, an application providing user interfaces of a plurality of medical devices, etc., but the disclosure is not limited thereto.

FIG. 1 is an exemplary diagram for illustrating a method for collecting and providing a user's facial image according to an embodiment of the disclosure.

As illustrated in FIG. 1, when a preset event is detected, the electronic device may operate a camera and photograph a user image. Here, a preset event may be diverse such as a lock release event, a text message reception event, a phone call reception event, an application execution event, a photographing function setting event, etc. of the electronic device. Here, a user image may include not only an image including a user, but also an image photographed when a preset event occurred. Specific examples of each event will be described later.

An electronic device may acquire a user's facial image from a user image, and when a user input is received, provide the acquired facial image to the user. Here, a facial image may be a user image including a user's face or an image which processed a user image including a user's face. Also, a user input may be a user instruction for being provided with an acquired facial image. For example, a user input may be input through a UI displayed on a display of an electronic device. However, the disclosure is not limited thereto, and in case a preset time or a preset condition is satisfied, an electronic device can obviously provide an acquired facial image.

Figure 2A:
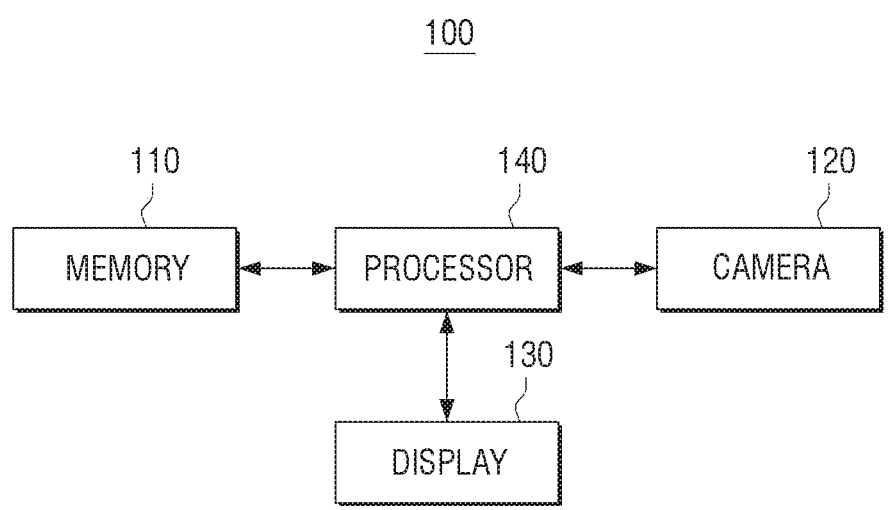
FIG. 2A is a block diagram schematically illustrating a configuration of an electronic device according to an embodiment of the disclosure.

FIG. 2A is a block diagram schematically illustrating a configuration of an electronic device according to an embodiment of the disclosure.

As illustrated in FIG. 2A, the electronic device 100 includes a memory 110, a camera 120, and a processor 140.

Here, the electronic device 100 may be implemented as a smartphone, but this is merely an example, and the electronic device 100 may include at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. Also, according to the various embodiments of the disclosure, a wearable device may include at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), or a bio-implantable type device (e.g.: an implantable circuit).

As another example, the electronic device 100 may be a home appliance. A home appliance may include, for example, at least one of a television, a digital video disk (DVD) player, an audio, a refrigerator, an air conditioner, a cleaner, an oven, a microwave oven, a washing machine, an air cleaner, a set-top box, a home automation control panel, a security control panel, a TV box (e.g.: Samsung Home-Sync™, Apple TV™, or Google TV™), a game console (e.g.: Xbox™, PlayStation™), an electronic dictionary, an electronic key, a camcorder, or an electronic photo frame.

As still another example, the electronic device 100 may include at least one of furniture or a part of a building/a structure, an electronic board, an electronic signature receiving device, a projector, or various kinds of measuring devices (e.g.: water supply, electricity, gas, or radio wave measuring devices, etc.).

The memory 110 may store various kinds of programs and data necessary for the operations of the electronic device 100. Also, the memory 110 may be implemented as a non-volatile memory, a volatile memory, a flash-memory, a hard disk drive (HDD), or a solid state drive (SSD), etc.

When a preset event occurs, the memory 110 may store a user image photographed by the camera 120. Further, when a facial image including a user's face is acquired from a user image, the memory 110 may store the acquired facial image.

The camera 120 is a component for acquiring a user image around the electronic device 100. Specifically, when a preset event is satisfied, the camera 120 may photograph a user image. Here, a preset event may be diverse such as an event regarding a specific time, an event regarding a specific state, an event by a specific behavior, etc., as well as a case wherein a user instruction for camera photographing was input.

The display 130 is a component for displaying various images. Specifically, the display 130 may display a user image photographed by the camera 120, and a user's facial image acquired from a user image. Also, the display may display various UIs for receiving input of an instruction to display the user image or facial image.

The processor 140 controls the overall operations of the electronic device. Specifically, when a preset event occurs, the processor 140 may control the camera 120 to acquire a user image by photographing a user. The time when a preset event occurs may mean the time before and after a preset event occurs.

Specifically, when a user input for lock release is input, the processor 140 may acquire a user image. Here, a user input for lock release may include a PIN input (a password input), a pattern input, fingerprint recognition, iris recognition, and user face recognition. As an example, in case a user input for lock release is user face recognition, when a user's face is recognized, the processor 140 may release the lock of the electronic device 100, and at the same time, control the camera 120 to photograph a user image. Meanwhile, it is obviously possible that the processor 140 recognizes a user face, and controls the camera 120 to photograph a user image before or after releasing the lock of the electronic device 100.

As another example, in case a user input for lock release is iris recognition, when a user's iris is recognized, the processor 140 may release the lock of the electronic device 100, and at the same time, control the camera 120 to photograph a user image. Meanwhile, it is obviously possible that the processor 140 recognizes a user's iris, and controls the camera 120 to photograph a user image before or after releasing the lock of the electronic device 100.

As still another example, in case a user input for lock release is fingerprint recognition, when a user's fingerprint is recognized, the processor 140 may release the lock of the electronic device 100, and at the same time, control the camera 120 to photograph a user image. Meanwhile, it is obviously possible that the processor 140 recognizes a user's fingerprint, and controls the camera 120 to photograph a user image before or after releasing the lock of the electronic device 100.

As still another example, in case a user input for lock release is a PIN or pattern input, when a PIN or a pattern is input, the processor 140 may release the lock of the electronic device 100, and at the same time, control the camera 120 to photograph a user image. Meanwhile, it is obviously possible that, after a PIN or a pattern is input, the processor 140 controls the camera 120 to photograph a user image before or after releasing the lock of the electronic device 100. Alternatively, it is obviously possible that the processor 140 controls the camera 120 to photograph a user image while a PIN or a pattern is being input.

Meanwhile, in case the lock screen of the electronic device 100 is released through user face recognition or iris recognition, the acquired user image may include a facial image. However, in case the lock of the electronic device 100 is released through fingerprint recognition, or a PIN or pattern input, a user image may not include a facial image. Accordingly, the processor 140 may acquire a user's facial image from a photographed user image. Specifically, the processor 140 may analyze a user image acquired through the camera 120 and acquire a facial image. In case a user's face is not included in a user image, or only a part of a user's face is included, the processor 140 may delete the user image wherein a user's face is not included or only a part of a user's face is included. Meanwhile, in case the lock screen of the electronic device 100 is released through iris recognition or user face recognition, the processor 140 may not analyze a user image photographed by the camera 120, but store the user image in the memory 110. That is, in case it is predicted that a user's face is included in a user image photographed by a preset event, the processor 140 may not analyze the user image but store the user image in the memory 110. However, the disclosure is not limited thereto, and the processor 140 may analyze all user images acquired through the camera 120, and acquire a user image (or a facial image) to be stored in the memory 110.

As another example, a preset event may be a specific state or an execution state of a specific application. For example, a specific state may be a state wherein a camera is lighting a user. In case a user's face is detected at the camera 120, the processor 140 may photograph a user image. Here, a facial image may be a user image, or an image that processed a user image. As still another example, an execution state of a specific application may be an execution state of a text message application, an execution state of a phone call application, an execution state of a search portal application, etc. In case various applications are executed and a user's face is detected at the camera 120, the processor 140 may photograph a user image. Here, a facial image may be a user image, or an image that processed a user image.

Meanwhile, the processor 140 may match a facial image and various kinds of information and store them in the memory 110. For example, the processor 140 may match information on the time and the location that a facial image is stored with a facial image, and store them.

Alternatively, the processor 140 may match a facial image and emotion information acquired by analyzing the facial image, and store them.

Alternatively, the processor 140 may match information on an application that is executed together when a facial image is stored with a facial image, and store them. Here, application information may be information on an application itself, or information on a source executed at an application. For example, in case a facial image is acquired while a text message application is executed and stored, the processor 140 may not only match the facial image and the text message application and store them, but also match the facial image and information on texts included in the text message application (information on a sender, a text received from a sender, and a text that a user sent) and store them. Alternatively, in case a facial image is acquired while a phone call application is executed and stored, the processor 140 may not only match the facial image and the phone call application and store them, but also match the facial image and voice information or image information included in the phone call application and store them. Alternatively, in case a facial image is acquired while a moving image application is executed and stored, the processor 140 may not only match the facial image and the moving image application and store them, but also match the facial image and information on the moving image that the moving image application is reproducing and store them. Alternatively, in case a facial image is acquired while a search portal application is executed and stored, the processor 140 may not only match the facial image and the search portal application and store them, but also match the facial image and information included in the search portal application (e.g., a news article, a search result, etc.) and store them.

Meanwhile, if a user input for identifying a facial image is received, the processor 140 may control the display 130 to provide a stored facial image according to a preset standard. Here, the preset standard may be a standard related to information matched with the facial image. As an example, the processor 140 may control the display 130 to provide a facial image according to passage of time. As another example, the processor 140 may control the display 130 to provide a facial image according to change of a place.

As another example, the processor 140 may analyze a facial image and determine an emotion corresponding to the facial image among a plurality of emotions, and control the display 130 to provide a facial image based on a plurality of emotions. Specifically, if a user input for identifying an emotion corresponding to a facial image is received, the processor 140 may classify a user's emotions determined during a preset period (e.g., one hour, a day, a week, a month, etc.), and control the display 130 to provide a facial image corresponding to the classified emotions. As another example, the processor 140 may control the display 130 to provide a facial image based on a specific emotion. For example, the processor 140 may control the display 130 to provide a facial image having the most joyful emotional state among facial images corresponding to a joyful emotion.

Here, in case there are a plurality of facial images to be provided, the processor 140 may control the display 130 to provide the plurality of facial images in the form of a panorama.

Figure 2B:
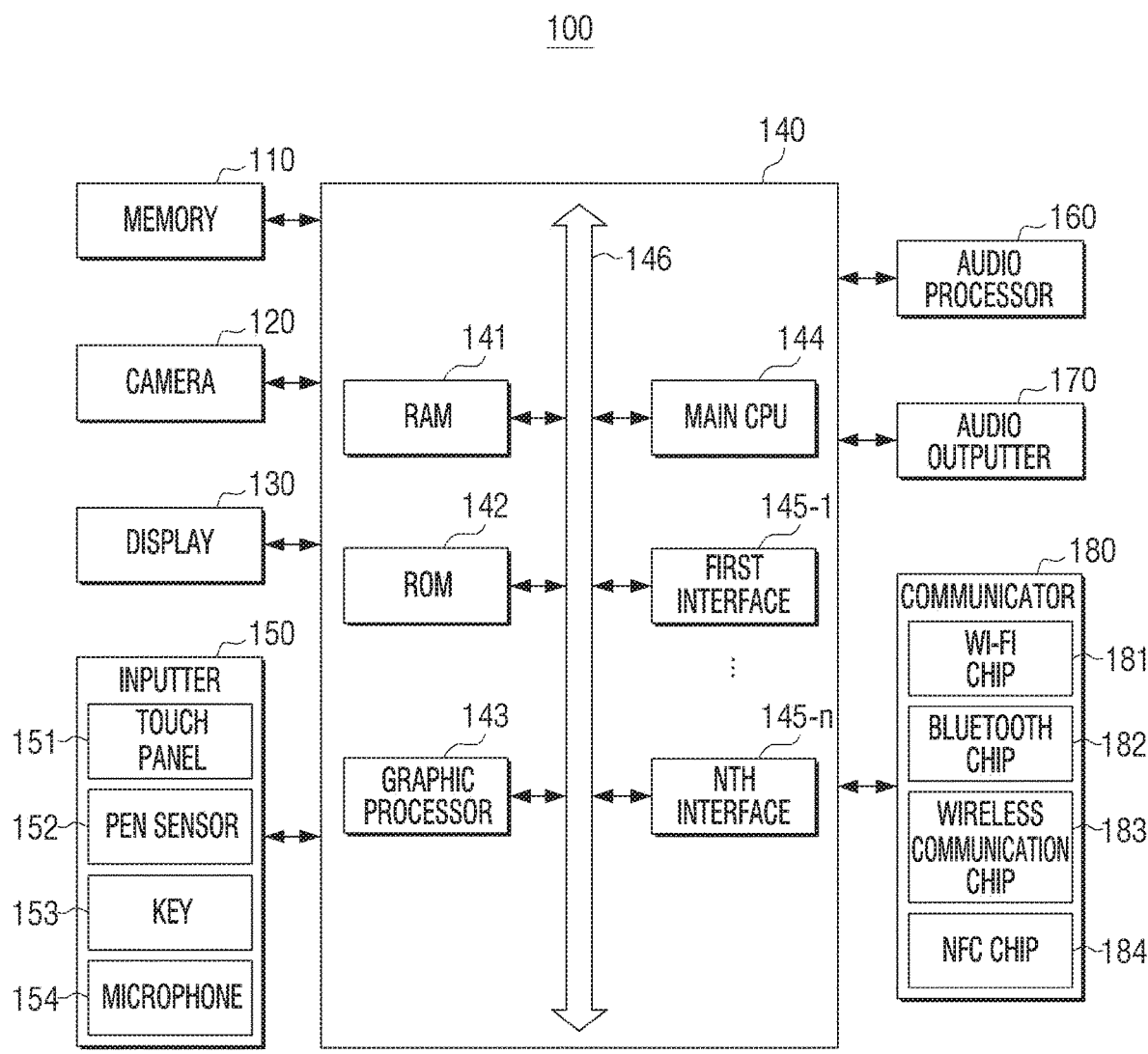
FIG. 2B is a block diagram illustrating in detail a configuration of an electronic device according to an embodiment of the disclosure.

FIG. 2B is a block diagram illustrating in detail a configuration of an electronic device according to an embodiment of the disclosure.

As illustrated in FIG. 2B, the electronic device 100 may further include an inputter 150, an audio processor 170, and a communicator 180, in addition to the memory 110, the camera 120, the display 130, and the processor 140. However, the disclosure is not limited to the aforementioned components, and some components can obviously be added or omitted depending on needs.

The memory 110 may store various kinds of programs and data necessary for the operations of the electronic device 100, as described above. Here, the memory 110 may include a hard disk, a memory, a cache, and a register.

The camera 120 may photograph still images and moving images. For example, the camera 120 may include at least one image sensor, lens, image signal processor (ISP), or flash (e.g.: an LED or a xenon lamp, etc.), and may consist of a plurality of cameras 120.

The display 130 may display various screens, as described above. Here, the display 130 may be implemented as display panels in various forms. For example, display panels may be implemented as various display technologies such as a liquid crystal display (LCD), organic light emitting diodes (OLED), active-matrix organic light-emitting diode (AM-OLED), liquid crystal on silicon (LcoS), digital light processing (DLP), etc.

Also, the display 130 may be coupled with at least one of the front surface area, the side surface area, or the rear surface area of the electronic device 100 in the form of a flexible display. A flexible display may be characterized in that it can be curved or bent or rolled without damage through a substrate which is thin as paper and flexible. Such a flexible display may be manufactured by using a plastic substrate, as well as a glass substrate that is generally used. In the case of using a plastic substrate, the plastic substrate may be formed by using a low temperature manufacturing processor, instead of using a conventional manufacturing processor to prevent damage to the substrate. Also, by replacing a glass substrate enclosing a flexible liquid crystal with a plastic film, flexibility of being able to fold and unfold can be provided. Such a flexible display has advantages that it is not only thin and light but also strong against shock, and can also be curved or bent and can be manufactured in various forms.

The inputter 150 may include a touch panel 151, a pen sensor 152, a key 153, and a microphone 154 for receiving various inputs. The touch panel 151 may be constituted as the display 130 and a touch sensor (not shown) are coupled, and the touch sensor may use at least one method among a capacitive method, a decompressive method, an infrared method, or an ultrasonic method. The touch panel may not have a display function, but also a function of detecting the location of a touch input, a touched area, and also the pressure of a touch input. In addition, the touch panel may have a function of detecting not only a real-touch but also a proximity touch. The pen sensor 152 may be implemented as a part of the touch panel 151, or may include a separate sheet for recognition. The key 153 may include a physical button, an optical key, or a keypad. The microphone 152 may include at least one of a built-in microphone or an external microphone.

In particular, the inputter 150 may receive external instructions from the aforementioned various components and transmit the instructions to the processor 140. The processor 140 may generate a control signal corresponding to a received input and thereby control the electronic device 100.

The audio processor 160 is a component performing processing of audio data. At the audio processor 160, various kinds of processing such as decoding or amplification, and noise filtering of audio data may be performed. Audio data processed at the audio processor 160 may be output to the audio outputter 170.

The audio outputter 170 is a component outputting not only various audio data for which various processing works such as decoding or amplification, and noise filtering were performed by the audio processor 160, but also various notification sounds or voice messages. In particular, the audio outputter 170 may be implemented as a speaker, but this is merely an example, and it may be implemented as an output terminal that can output audio data.

The communicator 180 may perform communication with an external device. In particular, the communicator 180 may include various communication chips such as a Wi-Fi chip 181, a Bluetooth chip 182, a wireless communication chip 183, an NFC chip 184, etc. Here, the Wi-Fi chip 181, the Bluetooth chip 182, and the NFC chip 184 respectively perform communication by a LAN method, a Wi-Fi method, a Bluetooth method, and an NFC method. In the case of using the Wi-Fi chip 181 or the Bluetooth chip 182, various types of connection information such as an SSID or a session key is transmitted and received first, and connection of communication is performed by using the information, and various types of information can be transmitted and received thereafter. The wireless communication chip 183 means a chip that performs communication according to various communication protocols such as IEEE, zigbee, 3rd generation (3G), 3rd generation partnership project (3GPP), and long term evolution (LTE).

The processor 140 may control the overall operations of the electronic device 100 by using various kinds of programs stored in the memory 110.

The processor 140 may consist of a RAM 141, a ROM 142, a graphic processor 143, a main CPU 144, first to nth interfaces 145-1 to 145-n, and a bus 146. Here, the RAM 141, the ROM 142, the graphic processor 143, the main CPU 144, and the first to nth interfaces 145-1 to 145-n may be connected with one another through the bus 146.

The RAM 141 stores an O/S and application programs. Specifically, when the electronic device 100 is booted, the O/S is stored in the RANI 141, and various kinds of application data that a user selected may be stored in the RAM 141.

The ROM 142 stores a set of instructions, etc. for system booting. When a turn-on instruction is input and power is supplied, the main CPU 144 copies the O/S stored in the memory 110 in the RAM 141 according to the instruction stored in the ROM 142, and boots the system by executing the O/S. When booting is completed, the main CPU 144 copies the various types of application programs stored in the memory 110 in the RAM 141, and performs various types of operations by executing the application programs copied in the RAM 141.

The graphic processor 143 generates a screen including various objects like icons, images, and texts by using an operation part (not shown) and a rendering part (not shown). Here, the operation part may be a component that operates attribute values such as coordinate values, shapes, sizes, and colors by which each object will be displayed according to the layout of the screen by using a control command received from the inputter 150. Also, the rendering part may be a component that generates screens in various layouts including objects, based on the attribute values operated at the operation part. Screens generated at such a rendering part may be displayed in a display area of the display 130.

The main CPU 144 accesses the memory 110, and performs booting by using the OS stored in the memory 110. Also, the main CPU 144 performs various operations by using various kinds of programs, contents, data, etc. stored in the memory 110.

The first to nth interfaces 145-1 to 145-n are connected with the aforementioned various kinds of components. One of the first to nth interfaces 145-1 to 145-n may be a network interface that is connected with an external device through a network.

Hereinafter, a method for acquiring a user image and a facial image and a method for providing the acquired facial image will be described with reference to FIGS. 3A to 4D.

Figure 3A:
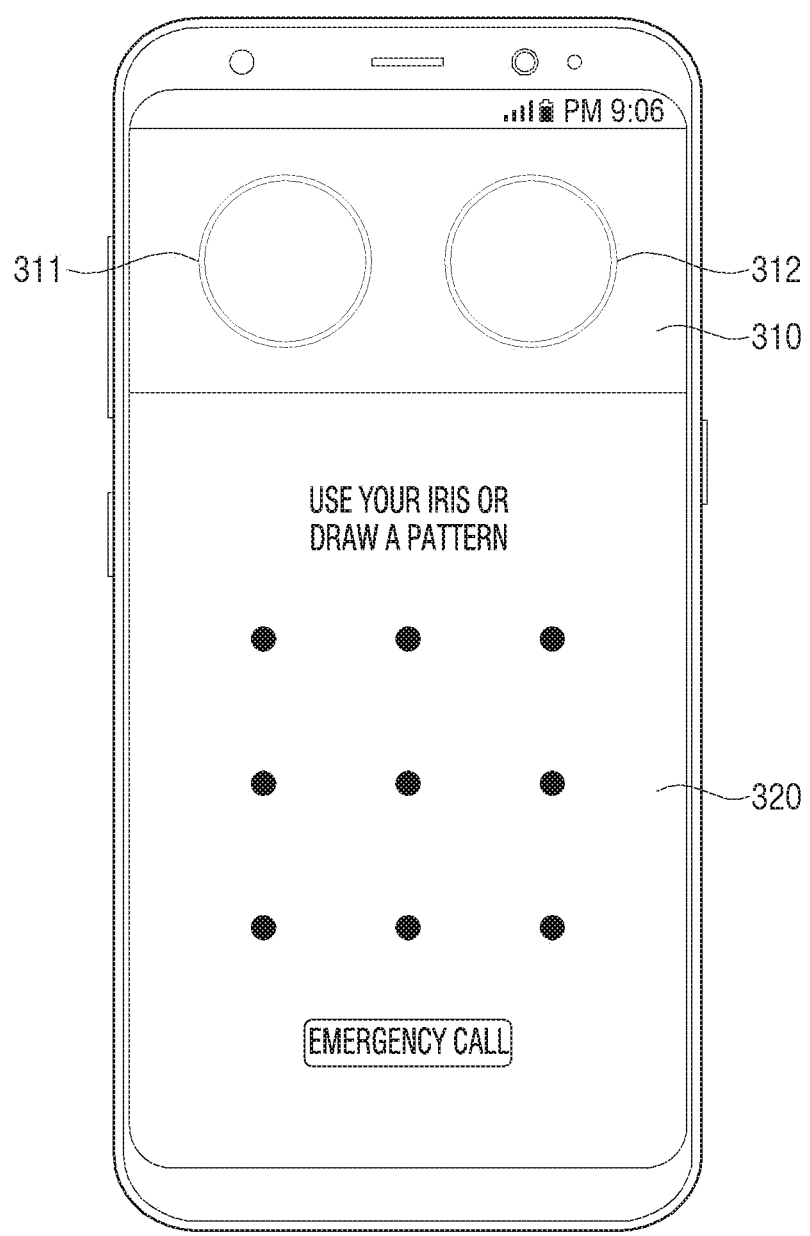
FIG. 3A is an exemplary diagram for illustrating a method for acquiring a user's image, a facial image, and providing the acquired facial image.

FIG. 3A is an exemplary diagram for illustrating a method for acquiring a user's image in the case of releasing a lock screen.

Specifically, as illustrated in FIG. 3A, the electronic device 100 may release the lock screen by performing iris recognition through the UI displayed in the first area 310 and the camera 120, or release a lock screen by inputting a pattern through the second UI 320. Specifically, release of the lock screen through iris recognition may be performed in case a user's iris is located on the first indicator 311 and the second indicator 312 displayed in the first area. Here, the electronic device 100 may acquire a user image while performing iris recognition. As described above, the time point of acquisition of a user image may be before iris recognition, after iris recognition, or at the same time as iris recognition. Meanwhile, for acquiring a user image for a user who has an iris registered in the electronic device 100, the electronic device 100 may determine first whether an iris acquired by the camera 120 is identical to the registered iris, and in case the iris acquired by the camera 120 is identical to the registered iris, the electronic device 100 may acquire a user image. A similar method may be applied not only in the case of release of a lock screen through iris recognition but also in the case of release of a lock screen through user face recognition.

Meanwhile, the electronic device 100 may acquire a user image by a method similar to iris recognition in the case of release of a lock screen through pattern recognition. That is, the electronic device 100 may photograph a user image while a pattern for release of a lock screen is being input or after a pattern is input. Like in the case of iris recognition, if a pattern is input through the second area 320, the electronic device 100 may determine whether the input pattern is a correct pattern, and in case the input pattern is a correct pattern, the electronic device 100 may acquire a user image. A similar method can obviously be applied in the cases of lock release through a PIN, and lock release through fingerprint recognition.

Meanwhile, in the case of release of a lock screen through iris recognition or user face recognition, as it is a lock release method by using a user's face, a user's face is included in a user image. However, in the case of release of a lock screen through a pattern input, there may be a case wherein a user's face is not included in a user image, depending on cases. Accordingly, in case a user image was acquired in the process of lock release through a pattern input, the electronic device 100 may acquire a facial image by analyzing the user image. Specifically, the electronic device 100 may identify only an image including a user's face among acquired user images, and store the image.

As another example, if a pattern for lock release is input, power is applied to the camera 120, and the electronic device 100 can obviously acquire a user image only in a case wherein a user face was recognized at the camera. A detailed example in this regard will be described later with reference to FIG. 3B.

That is, in the case of release of a lock screen through iris recognition and user face recognition wherein the electronic device 100 can acquire a user image including a user's face, the electronic device 100 may use a user image as a facial image, and in the case of lock release through a pattern input, a PIN input, and fingerprint recognition wherein it is unclear whether a user image is a user image including a user's face, the electronic device 100 may determine whether a user's face is included in a user image, and use a user image including a user's face as a facial image.

Figure 3B:
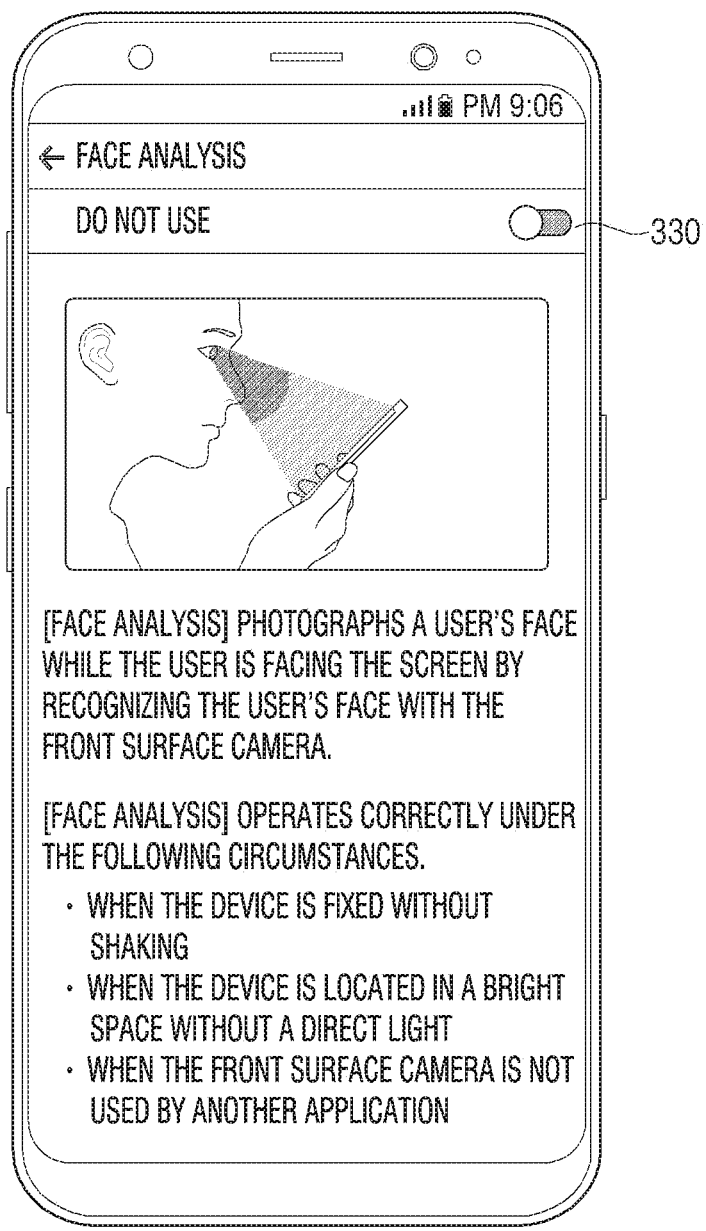
FIG. 3B is an exemplary diagram for illustrating a method for acquiring a user's image, a facial image, and providing the acquired facial image.

FIG. 3B is an exemplary diagram for illustrating a method for acquiring a user's image according to another embodiment of the disclosure.

As illustrated in FIG. 3A, the electronic device 100 may acquire a user image at the time of release of a lock screen, but the electronic device 100 may also acquire a user image in case a user is using the electronic device 100. For example, in case power was applied to the display 130, the electronic device 100 may acquire a user image. Here, the electronic device 100 may acquire a user image at a preset time interval or the time point when an application of the electronic device 100 is executed, while the application is executed, or when the application is finished.

However, like in the case of the aforementioned pattern input, there may be a case wherein a user image including a facial image is not acquired even when a user is using the electronic device 100.

Accordingly, as illustrated in FIG. 3B, the electronic device 100 may acquire a user image only while the camera 120 is recognizing a user face. Meanwhile, in the case of photographing a user image while the camera 120 is recognizing a user face, if the electronic device 100 is being used, power should always be applied to the camera 120, and thus power consumption may be big. Accordingly, as illustrated in FIG. 3B, the electronic device 100 may display a UI 330 that can select whether to apply power to the camera 120 all the time while the electronic device 100 is being used.

FIGS. 4A to 4D are exemplary diagrams for illustrating a method for providing an acquired user image according to an embodiment of the disclosure.

Figure 4A:
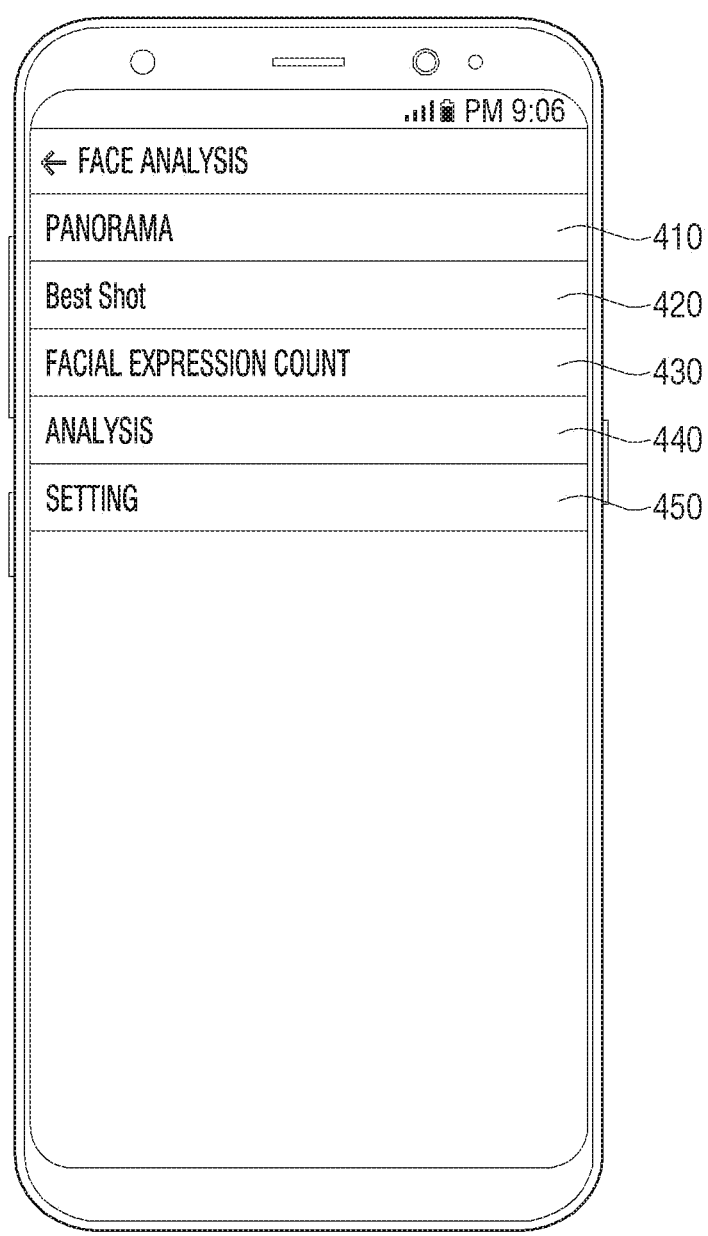
FIG. 4A is an exemplary diagram for illustrating a method for acquiring a user's image, a facial image, and providing the acquired facial image.

The electronic device 100 may provide an acquired user image by various methods according to various standards. Here, the electronic device 100 may match an acquired user image with various kinds of information and store them. For example, the electronic device 100 may match an acquired user image with at least one of the information on the time and place that the user image was acquired, the schedule information, the emotion information acquired by analyzing a facial image included in the acquired user image, the information on the application used when a user image is acquired, or the information that the application executed when a user image is acquired provides, and store them. The electronic device 100 may provide the user image based on the information that the user selected among the information matched with the user image. Here, as illustrated in FIG. 4A, the electronic device 100 may provide UIs 410 to 450 for selecting provision methods according to various standards.

Figure 4B:
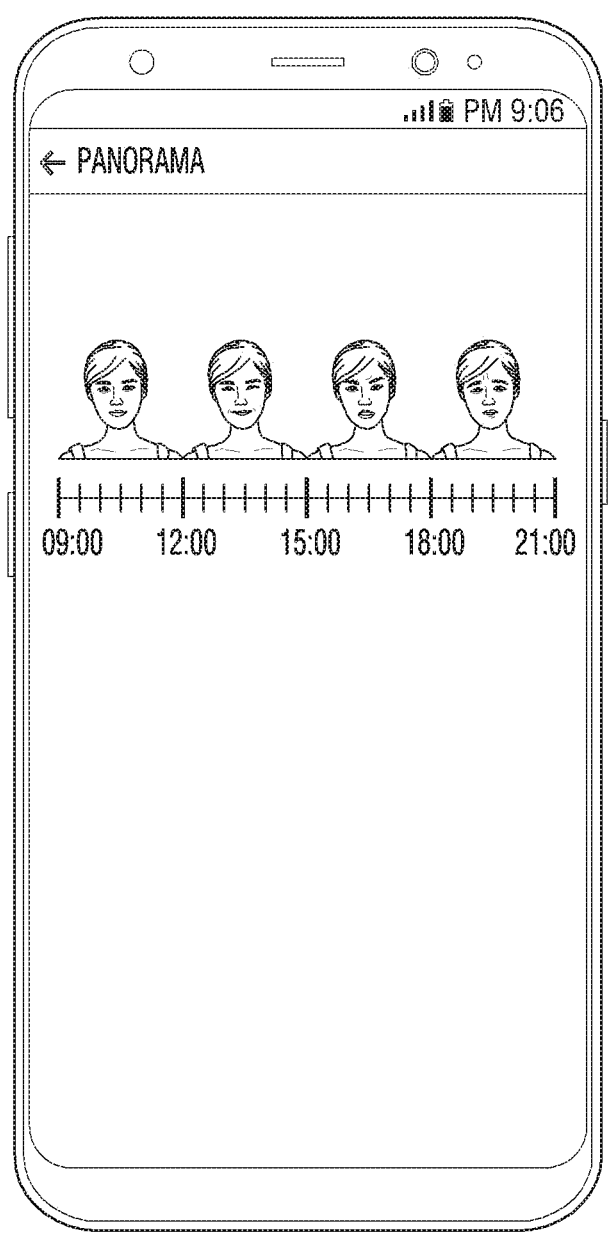
FIG. 4B is an exemplary diagram for illustrating a method for acquiring a user's image, a facial image, and providing the acquired facial image.

Specifically, when a user instruction through the first UI 410 is input, the electronic device 100 may display a user image in the form of a panorama, as illustrated in FIG. 4B. Here, a user image displayed in the form of a panorama may be displayed according to a temporal order. For example, an image displayed in the form of a panorama may be displayed at a preset time interval (e.g., one hour) during a preset time period (e.g., a day). However, the disclosure is not limited thereto, and the electronic device 100 can obviously display a panorama image based on the change of a place.

As another example, the electronic device 100 may provide a user image wherein the degree of the emotion is the highest among user images corresponding to an emotion selected by a user instruction. That is, the electronic device 100 may determine an emotion corresponding to a facial image among a plurality of emotions (happiness, sadness, joy, anxiety, etc.), and provide a user image wherein the degree of the emotion is the highest among facial images corresponding to an emotion selected by a user instruction.

Figure 4C:
FIG. 4C is an exemplary diagram for illustrating a method for acquiring a user's image, a facial image, and providing the acquired facial image.

Specifically, as illustrated in FIG. 4B, the electronic device 100 may provide a user image having the happiest emotion during a day. Here, the electronic device 100 may provide other information matched with the user image together. For example, as illustrated in FIG. 4C, the electronic device 100 may provide information on the time and place that a user image having the happiest emotion was acquired, and the schedule together. The electronic device 100 can obviously provide a best shot for emotions other than a happy emotion.

Figure 4D:
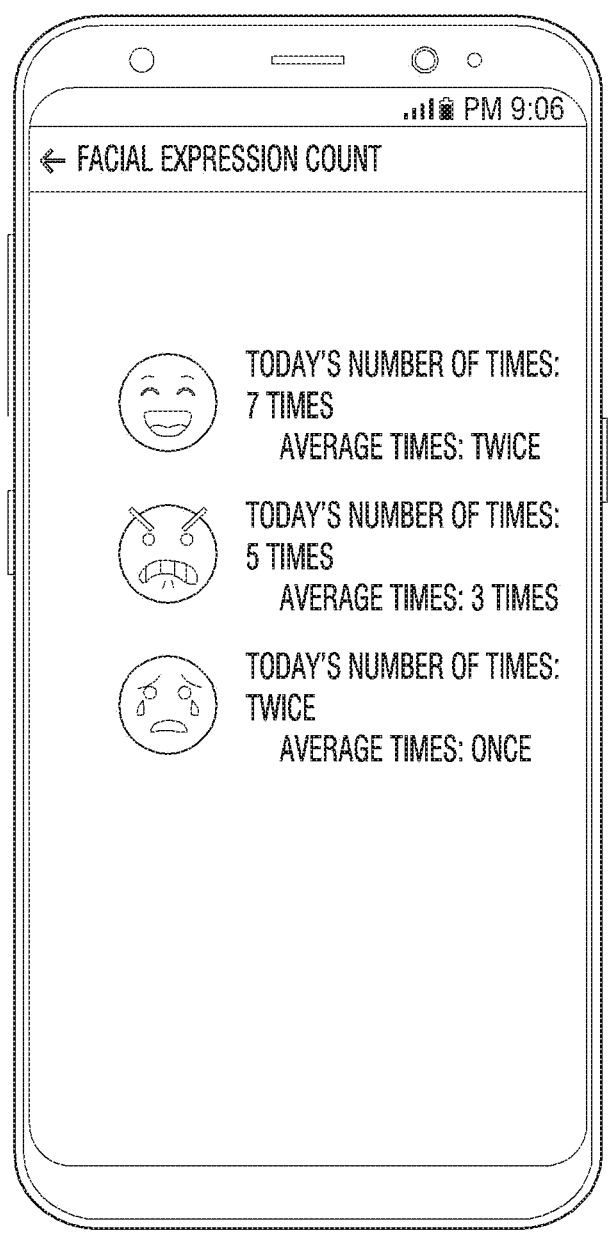
FIG. 4D is an exemplary diagram for illustrating a method for acquiring a user's image, a facial image, and providing the acquired facial image.

As another example, the electronic device 100 may match an emotion corresponding to a facial image and store it, and classify a plurality of emotions and provide them to a user. For example, as illustrated in FIG. 4D, the electronic device 100 may calculate the number and average of facial images corresponding to a happy emotion, the number and average of facial images corresponding to an angry emotion, and the number and average of facial images corresponding to a sad emotion during a preset time period (e.g., one day), and provide them to a user.

In addition to the aforementioned example, the electronic device 100 may provide a facial image based on various kinds of matched information. For example, the electronic device 100 may match a facial image and an application used when a facial image is acquired and store them. The electronic device 100 may classify facial images based on an application used by a user, and provide them. For example, the electronic device 100 may collect facial images when a user is using an application every day, and provide the collected facial images. Alternatively, the electronic device 100 may determine the emotions of the collected facial images. The electronic device 100 may analyze that the emotion of the user using an application every day is generally "brusqueness" and provide it to the user. Alternatively, the electronic device 100 may collect facial images when a user is using a video content providing application, and provide the collected facial images. Alternatively, the electronic device 100 may determine the emotions of the collected facial images. The electronic device 100 may analyze that the emotion of the user using a video content providing application is generally "joy" and provide it to the user.

As another example, the electronic device 100 may not only analyze a facial image of a user according to the type of an application, but also match various kinds of information used in an application and a user's emotions and store them, and provide them to the user. For example, in case a facial image was acquired while a user was using a text message application, the electronic device 100 may match the acquired facial image and the text message application, and store them. Further, the electronic device 100 may analyze the content of a text message received through the text message application, and match the analysis result and the acquired facial image and store them. For example, the electronic device 100 may analyze the sender of a text message, the content of a text message, etc., and match the analysis result and the acquired facial image and store them. In case the standard for providing a facial image is a specific person (e.g., the sender of a text message), the electronic device 100 may provide the content of the text message that the specific person sent and the acquired facial image to the user together.

Here, some or all of the aforementioned various functions of the electronic device 100 may be implemented through an artificial intelligence model. For example, the electronic device 100 may input a user's facial image into an artificial intelligence algorithm and acquire the user's emotional state, or input the information of an application that a user uses into an artificial intelligence algorithm and acquire information that caused the emotional state of the user.

Figure 5:
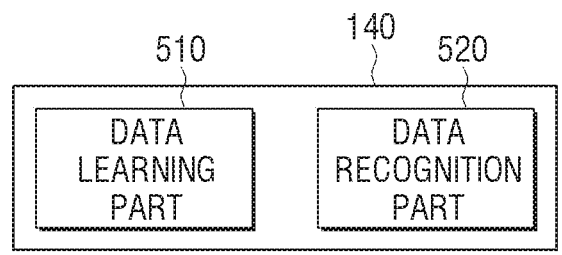
FIG. 5 is a block diagram of a processor according to some embodiments of the disclosure.

Specifically, referring to FIG. 5, the processor 140 according to some embodiments of the disclosure may include a data learning part 510 and a data recognition part 520.

In the data learning part 510, a data recognition model may input a user's facial image into an artificial intelligence algorithm and acquire the user's emotional state, or input information of an application that a user uses into an artificial intelligence algorithm and learn information on an application that caused the user's emotional state. The data recognition part 520 may determine the user's emotional state or information on the application that caused the user's emotional state based on recognition data. Also, the data recognition part 520 may recognize the user's emotional state or information on the application that caused the user's emotional state according to a learned standard by using a learned data recognition model. The data recognition part 520 may acquire specific recognition data according to a preset standard, and apply the acquired recognition data as an input value to a data recognition model, and thereby determine or estimate a user's emotion or information on an application that caused the user's emotion. Also, a result value output by applying the acquired recognition data as an input value to a data recognition model may be used in updating the data recognition model.

Here, at least a part of the data learning part 510 or at least a part of the data recognition part 520 may be implemented as a software module or manufactured in the form of at least one hardware chip and mounted on the electronic device. For example, at least one of the data learning part 510 or the data recognition part 520 may be manufactured in the form of a dedicated hardware chip for artificial intelligence (AI), or manufactured as a part of a conventional generic-purpose processor (e.g.: a CPU or an application processor) or a graphic-dedicated processor (e.g.: a GPU), and installed on the aforementioned various types of electronic devices. Here, a dedicated hardware chip for artificial intelligence is a dedicated processor specialized in probability operations, and it has higher performance in parallel processing than conventional generic-purpose processors, and is capable of processing operation works swiftly in the field of artificial intelligence like machine learning. In case the data learning part 510 and the data recognition part 520 are implemented as a software module (or, a program module including instructions), the software module may be stored in a non-transitory computer readable medium. In this case, the software module may be provided by an operating system (OS), or provided by a specific application. Alternatively, a part of the software module may be provided by an operating system (OS), and the other parts may be provided by a specific application.

In this case, the data learning part 510 and the data recognition part 520 may be installed on one electronic device, or respectively installed on separate electronic devices. For example, one of the data learning part 510 and the data recognition part 520 may be included in the electronic device 100, and the other one may be included in an external server. Also, the data learning part 510 and the data recognition part 520 may be connected by wire or wirelessly, and model information constructed by the data learning part 510 may be provided to the data recognition part 520, and data input into the data recognition model 520 may be provided to the data learning part 510 as additional learning data.

Figure 6A:
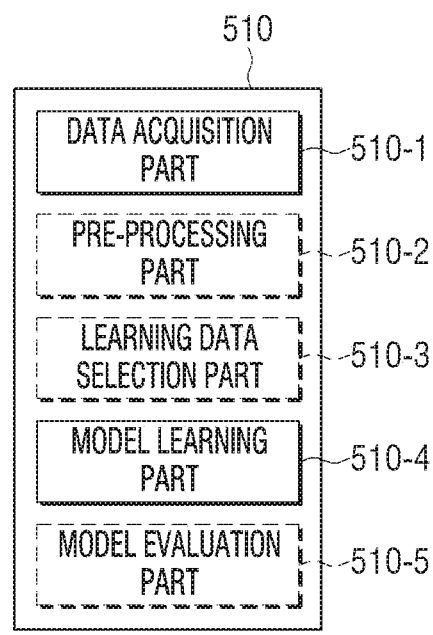
FIG. 6A is a block diagram of a data learning part 610 according to the embodiments of the disclosure.

FIG. 6A is a block diagram of the data learning part 510 according to the embodiments of the disclosure.

Referring to FIG. 6A, the data learning part 510 according to some embodiments of the disclosure may include a data acquisition part 510-1 and a model learning part 510-4. Also, the data learning part 510 may selectively further include at least one of a pre-processing part 510-2, a learning data selection part 510-3, and a model evaluation part 510-5.

The data acquisition part 510-1 may acquire learning data necessary for learning for determining a user's emotion or information on an application that caused the user's emotion. As learning data, data collected or tested by the data learning part 510 or the manufacturer of the electronic device 100 may be used. Alternatively, as learning data, data collected by the electronic device 100 according to the disclosure may be used.

The model learning part 510-4 may train the data recognition model to have a standard for determination regarding how to determine the degree of importance of a user's emotion or information on an application that caused the user's emotion by using learning data. For example, the model learning part 510-4 may train the data recognition model through supervised learning using at least a part of learning data as a standard for determination. Alternatively, the model learning part 510-4 may, for example, train the data recognition model through unsupervised learning finding a standard for determination for determining a user's emotion or information on an application that caused the user's emotion by learning by itself using learning data without any supervision.

Also, the model learning part 510-4 may learn a standard for selection regarding which learning data is to be used for determining a user's emotion or information on an application that caused the user's emotion.

In particular, the model learning part 510-4 according to an embodiment of the disclosure may generate or train the data recognition model by using learning data related to the name of the executed application, the category information, the name of data collected at the application, the variable name of data collected at the application, the source code of the program related to data collected at the application, etc.

Meanwhile, the data recognition model may be a model that is constructed in advance, and is updated by training of the model learning part 510-4. In this case, the data recognition model may have been constructed in advance by receiving input of basic learning data.

The data recognition model may be constructed in consideration of the field to which the recognition model is applied, the purpose of learning, or the computer performance of the device, etc. The data recognition model may be, for example, a model based on a neural network. The data recognition model may be designed to simulate the brain structure of a human on a computer. Also, the data recognition model may include a plurality of network nodes having weights that simulate neurons of the neural network of a human. The plurality of network nodes may each form a connection relationship so as to simulate synaptic activities of neurons exchanging signals via synapses. The data recognition model may include, for example, a neural network model, or a deep learning model developed from a neural network model. In a deep learning model, a plurality of network nodes may be located in different depths (or, layers) from one another, and exchange data according to a relationship of convolution connection.

For example, models like a deep neural network (DNN), a recurrent neural network (RNN), a bidirectional recurrent deep neural network (BRDNN), and the like may be used as the data recognition model, but the data recognition model is not limited to the aforementioned examples.

According to the various embodiments of the disclosure, in case there are a plurality of data recognition models constructed in advance, the model learning part 510-4 may determine a data recognition model wherein relevance between input learning data and the basic learning data is big as a data recognition model to be learned. In this case, the basic learning data may have been classified in advance for each type of data, and data recognition models may have been constructed in advance for each type of data. For example, the basic learning data may have been classified in advance according to various standards such as the region wherein the learning data was generated, the time when the learning data was generated, the size of the learning data, the genre of the learning data, the generator of the learning data, the types of objects in the learning data, etc.

Also, the model learning part 510-4 may, for example, train the data recognition model by using a learning algorithm including error back-propagation or gradient descent, and the like.

In addition, the model learning part 510-4 may, for example, train the data recognition model through supervised learning using the aforementioned various application information as an input value. Alternatively, the model learning part 510-4 may, for example, train the data recognition model through unsupervised learning finding a standard for determination of the degree of importance of an application or data and a security parameter by learning by itself using necessary learning data without any supervision. Further, the model learning part 510-4 may, for example, train the data recognition model through reinforcement learning using a feedback on whether a result of determination of the degree of importance of an application or data and a security parameter according to learning is correct.

Also, when the data recognition model is trained, the model learning part 510-4 may store the trained data recognition model. In this case, the model learning part 510-4 may store the trained data recognition model in the memory 110 of the electronic device 100. Alternatively, the model learning part 510-4 may store the trained data recognition model in the memory of a server connected with the electronic device 100 through a wired or wireless network.

The data learning part 510 may further include a pre-processing part 510-2 and a learning data selection part 510-3, for improving the recognition result of the data recognition model, or saving resources or time necessary for generating the data recognition model.

The pre-processing part 510-2 may pre-process data acquired at the data acquisition part 510-1 for using the data in learning for determination of a user's emotion or information on an application that caused the user's emotion.

For example, the pre-processing part 510-2 may process acquired data in a predefined format, so that the model learning part 510-4 can easily use data for training the data recognition model. The pre-processed data may be provided to the model learning part 510-4 as learning data.

Alternatively, the learning data selection part 510-3 may optionally select learning data necessary for learning among the pre-processed data. The selected learning data may be provided to the model learning part 510-4. The learning data selection part 510-3 may select learning data necessary for learning among the pre-processed data, according to a preset standard for selection. Also, the learning data selection part 510-3 may select learning data necessary for learning according to a preset standard for selection by learning by the model learning part 510-4. According to an embodiment of the disclosure, the learning data selection part 510-3 may select only the name of the executed application and the category information among the input learning data.

The data learning part 510 may further include a model evaluation part 510-5, for improving the recognition result of the data recognition model.

The model evaluation part 510-5 may input evaluation data into the data recognition model, and in case the recognition result output from the evaluation data does not satisfy a preset standard, the model evaluation part 510-5 may make the model learning part 510-4 learn again. In this case, the evaluation data may be predefined data for evaluating the data recognition model.

For example, in case the number or ratio of evaluation data of which recognition result is not correct exceeds a preset threshold value, among the recognition results of the trained data recognition model regarding the evaluation data, the model evaluation part 510-5 may evaluate that a preset standard was not satisfied. For example, in case the preset standard is defined as a ratio of 2%, if the trained data recognition model outputs incorrect recognition results regarding evaluation data exceeding the number of 20 among evaluation data in the number of 1000 in total, the model evaluation part 510-5 may evaluate that the trained data recognition model is not appropriate.

Meanwhile, in case there are a plurality of trained data recognition models, the model evaluation part 510-5 may evaluate each of the trained data recognition models whether it satisfies a preset standard, and determine a model satisfying the preset standard as a final data recognition model. In this case, if there are a plurality of models satisfying the preset standard, the model evaluation part 510-5 may determine any one or a specific number of models determined in advance in the order of having a higher evaluation score as final data recognition models.

Figure 6B:
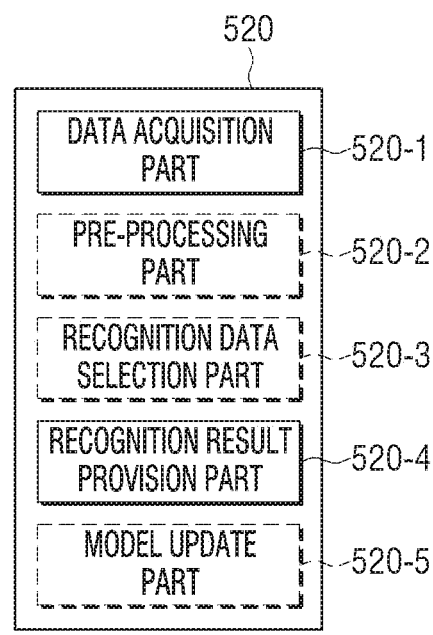
FIG. 6B is a block diagram of a data recognition part 620 according to some embodiments of the disclosure.

FIG. 6B is a block diagram of the data recognition part 520 according to some embodiments of the disclosure.

Referring to FIG. 6B, the data recognition part 520 according to some embodiments of the disclosure may include a data acquisition part 520-1 and a recognition result provision part 520-4. Also, the data recognition part 520 may optionally further include at least one of a pre-processing part 520-2, a recognition data selection part 520-3, or a model update part 520-5.

The data acquisition part 520-1 may acquire recognition data necessary for determination of a user's emotion or information on an application that caused the user's emotion.

The recognition result provision part 520-4 may apply data acquired at the data acquisition part 520-1 as an input value to the trained data recognition model and thereby determine a user's emotion or information on an application that caused the user's emotion. Also, the recognition result provision part 520-4 may provide a recognition result according to the purpose of data recognition. Alternatively, the recognition result provision part 520-4 may provide a recognition result acquired by applying data pre-processed at the pre-processing part 520-2 that will be described below as an input value to the trained data recognition model. Alternatively, the recognition result provision part 520-4 may provide a recognition result by applying data selected by the recognition data selection part 520-3 that will be described below as an input value to the data recognition model.

The data recognition part 1210 may further include a pre-processing part 520-2 and a recognition data selection part 520-3, for improving the recognition result of the data recognition model, or saving resources or time for providing a recognition result.

The pre-processing part 520-2 may pre-process the data acquired at the data acquisition part 520-1 for using the data in recognition for determination of a user's emotion or information on an application that caused the user's emotion.

Also, the pre-processing part 520-2 may process the acquired data in a predefined format, so that the recognition result provision part 520-4 can easily use data for determination of a user's emotion or information on an application that caused the user's emotion.

The recognition data selection part 520-3 may select recognition data necessary for determination of the degree of importance of an application or data and a security parameter among the pre-processed data. The selected recognition data may be provided to the recognition result provision part 520-4. The recognition data selection part 520-3 may select recognition data necessary for determination of the degree of importance of an application or data and a security parameter among the pre-processed data, according to a preset standard for selection. Also, the recognition data selection part 520-3 may select data according to a preset standard for selection by learning by the aforementioned model learning part 510-4.

The model update part 520-5 may perform control such that the data recognition model is updated, based on the evaluation of the recognition result provided by the recognition result provision part 520-4. For example, the model update part 520-5 may provide the recognition result provided by the recognition result provision part 520-4 to the model learning part 510-4, and thereby control the model learning part 510-4 to update the data recognition model.

At least one of the aforementioned data acquisition part 510-1, the pre-processing part 510-2, the learning data selection part 510-3, the model learning part 510-4, and the model evaluation part 510-5 inside the data learning part 510, and the data acquisition part 520-1, the pre-processing part 520-2, the recognition data selection part 520-3, the recognition result provision part 520-4, and the model update part 520-5 inside the data recognition part 520 may be implemented as a software module or manufactured in the form of at least one hardware chip, and mounted on the electronic device. For example, at least one of the data acquisition part 510-1, the pre-processing part 510-2, the learning data selection part 510-3, the model learning part 510-4, the model evaluation part 510-5, the data acquisition part 520-1, the pre-processing part 520-2, the recognition data selection part 520-3, the recognition result provision part 520-4, and the model update part 520-5 may be manufactured in the form of a dedicated hardware chip for artificial intelligence (AI), or manufactured as a part of a conventional generic-purpose processor (e.g.: a CPU or an application processor) or a graphic-dedicated processor (e.g.: a GPU), and mounted on the aforementioned various types of electronic devices.

Also, the data acquisition part 510-1, the pre-processing part 510-2, the learning data selection part 510-3, the model learning part 510-4, the model evaluation part 510-5, the data acquisition part 520-1, the pre-processing part 520-2, the recognition data selection part 520-3, the recognition result provision part 520-4, and the model update part 520-5 may be mounted on one electronic device, or respectively mounted on separate electronic devices. For example, some of the data acquisition part 510-1, the pre-processing part 510-2, the learning data selection part 510-3, the model learning part 510-4, the model evaluation part 510-5, the data acquisition part 520-1, the pre-processing part 520-2, the recognition data selection part 520-3, the recognition result provision part 520-4, and the model update part 520-5 may be included in the electronic device, and the others may be included in a server.

In addition, at least one of the data acquisition part 510-1, the pre-processing part 510-2, the learning data selection part 510-3, the model learning part 510-4, the model evaluation part 510-5, the data acquisition part 520-1, the pre-processing part 520-2, the recognition data selection part 520-3, the recognition result provision part 520-4, and the model update part 520-5 may be implemented as a software module. In case at least one of the data acquisition part 510-1, the pre-processing part 510-2, the learning data selection part 510-3, the model learning part 510-4, the model evaluation part 510-5, the data acquisition part 520-1, the pre-processing part 520-2, the recognition data selection part 520-3, the recognition result provision part 520-4, and the model update part 520-5 is implemented as a software module (or, a program module including instructions), the software module may be stored in a non-transitory computer readable medium. Also, in this case, at least one software module may be provided by an operating system (OS), or provided by a specific application. Alternatively, some of the at least one software module may be provided by an operating system (OS), and the others may be provided by a specific application.

Figure 7:
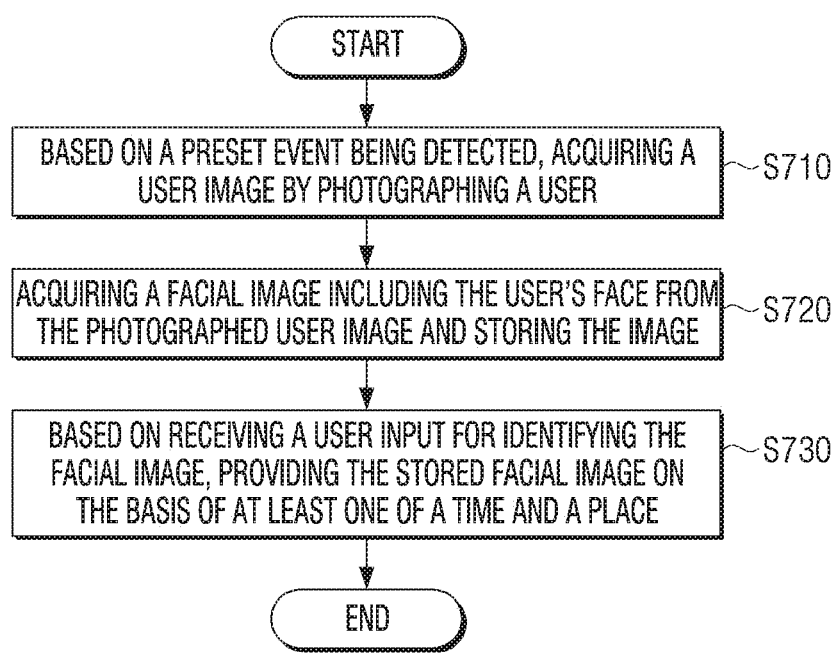
FIG. 7 is a flow chart illustrating a method for controlling an electronic device according to an embodiment of the disclosure.

FIG. 7 is a flow chart illustrating a method for controlling an electronic device according to an embodiment of the disclosure.

When a preset event is detected, the electronic device 100 may acquire a user image by photographing a user at operation S710. Here, a present event may be a lock release event through iris recognition, fingerprint recognition, face recognition, a PIN input, a pattern input, etc. Alternatively, a preset event may be an event wherein a user uses the electronic device 100.

The electronic device 100 may acquire a facial image including the user's face from the photographed user image and store the image at operation S720. Specifically, the electronic device 100 may determine whether the user's face is included in the user image, and in case the user's face is included, the electronic device 100 may acquire the user's facial image from the user image. Meanwhile, as described above, in case it is highly likely that a user's facial image is included in a user image (lock release through iris recognition, face recognition, and the like), a user image may be acquired as a facial image and stored.

Then, when a user input for identifying the facial image is received, the electronic device 100 may provide the stored facial image on the basis of at least one of a time and a place at operation S730. Meanwhile, as described above, the electronic device 100 may not only provide the facial image on the basis of at least one of a time and a place, but also provide facial images acquired based on various standards such as the user's emotional state, information on the application that the user uses, etc.

The methods described above may be implemented in the forms of program instructions that can be performed through various computer means and recorded in a computer readable medium. The computer readable medium may include a program instruction, a data file, a data structure, etc. as a single entity or in combination. Program instructions recorded in the medium may be those that are specially designed and constructed for the disclosure or may be those that are known to people working in the field of computer software and are usable. Examples of a computer readable recording medium include magnetic media like a hard disk, a floppy disk, and a magnetic tape, optical media like a CD-ROM and a DVD, magneto-optical media like a floptical disk, and hardware devices that are specifically constructed to store and perform program instructions like a ROM, a RAM, and a flash memory. Meanwhile, examples of program instructions include not only machine language codes that are made by a compiler, but also high level language codes that can be executed by a computer by using an interpreter, etc. Hardware devices like the above may be constructed to operate as at least one software module for performing the operations in the disclosure, and the same is true vice versa.

As can be seen above, the disclosure has been described with reference to limited embodiments and drawings, but the disclosure is not limited to the aforementioned embodiments, and various amendments and modifications may be made from the descriptions of the disclosure by those having ordinary skill in the field to which the disclosure belongs. Therefore, the scope of the disclosure is not to be defined while being limited to the embodiments described above, but by the appended claims and the equivalents of the claims.

What is claimed is:

1. A control method for an electronic device, the method comprising:

based on a preset event being detected, acquiring a user image by photographing a user;

acquiring a facial image including a user's face from the photographed user image;

identifying a sample facial image similar to the acquired facial image among a plurality of sample facial images stored in a memory by analyzing the acquired facial image;

identifying an application matched with the identified sample facial image;

identifying emotion information corresponding to the acquired facial image as an emotion matched with the identified application; and based on a user input for identifying the acquired facial image, displaying the acquired facial image and the emotion information corresponding to the acquired facial image, based on the identified application, wherein the displaying further comprises:

based on the acquired facial image being present in a plural number, displaying the plurality of acquired facial images in a form of a panorama on a basis of at least one of a time and a place.

2. The control method of claim 1, wherein the method further comprises:

based on data related to the time that the user image is photographed being present, matching the photographed user image and the data and storing them.

3. The control method of claim 1, wherein the method further comprises:

matching location information corresponding to the photographed user image with the user image and storing them.

4. The control method of claim 1, wherein the preset event is at least one of a lock release event, a text message reception event, a phone call reception event, an application execution event, or a content viewing event of the electronic device.

5. The control method of claim 4, wherein the lock release event includes at least one of iris recognition, face recognition, fingerprint recognition, or pattern recognition.

6. An electronic device comprising:

a camera;

a display;

a memory storing a plurality of sample facial images, a plurality of applications matched with the plurality of sample images, and information of emotion matched with the plurality of applications; and a processor configured to:

based on a preset event being detected, acquire a user image by photographing a user by controlling the camera, acquire a facial image including a user's face from the photographed user image, identify a sample facial image similar to the acquired facial image among the plurality of sample facial images stored in the memory by analyzing the acquired facial image, identify an application matched with the identified sample facial image, identify emotion information corresponding to the acquired facial image as an emotion matched with the identified application, and based on a user input for identifying the acquired facial image, control the display to display the acquired facial image and the emotion information corresponding to the acquired facial image, based on the identified application, wherein the processor is further configured to:
  based on the acquired facial image being present in a plural number, control the display to display the plurality of acquired facial images in a form of a panorama on a basis of at least one of a time and a place.

7. The electronic device of claim 6, wherein the processor is further configured to:
  based on data related to the time that the user image is photographed being present, match the photographed user image and the data and store them in the memory.

8. The electronic device of claim 6, wherein the processor is further configured to:
  match location information corresponding to the photographed user image with the user image and store them in the memory.

9. The electronic device of claim 6, wherein the preset event is at least one of a lock release event, a text message reception event, a phone call reception event, an application execution event, or a content viewing event of the electronic device.

* * * * *